UNITED STATES PATENT OFFICE.

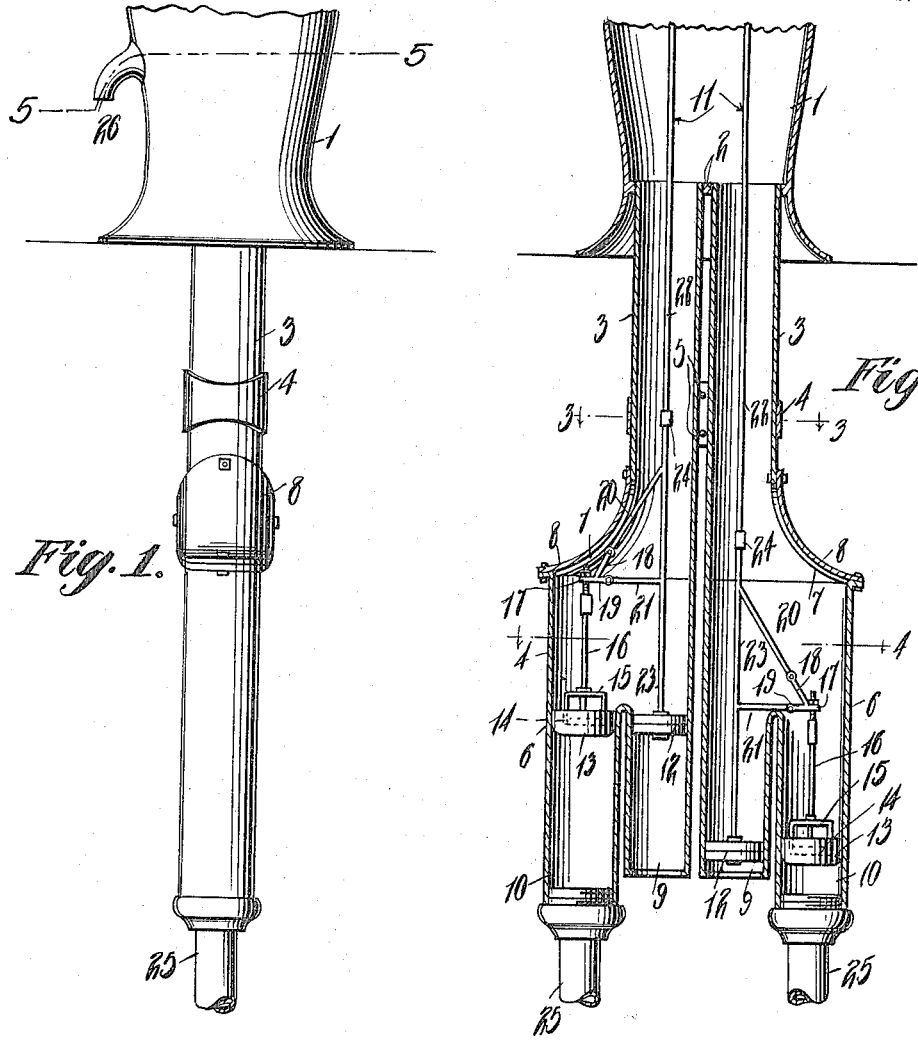

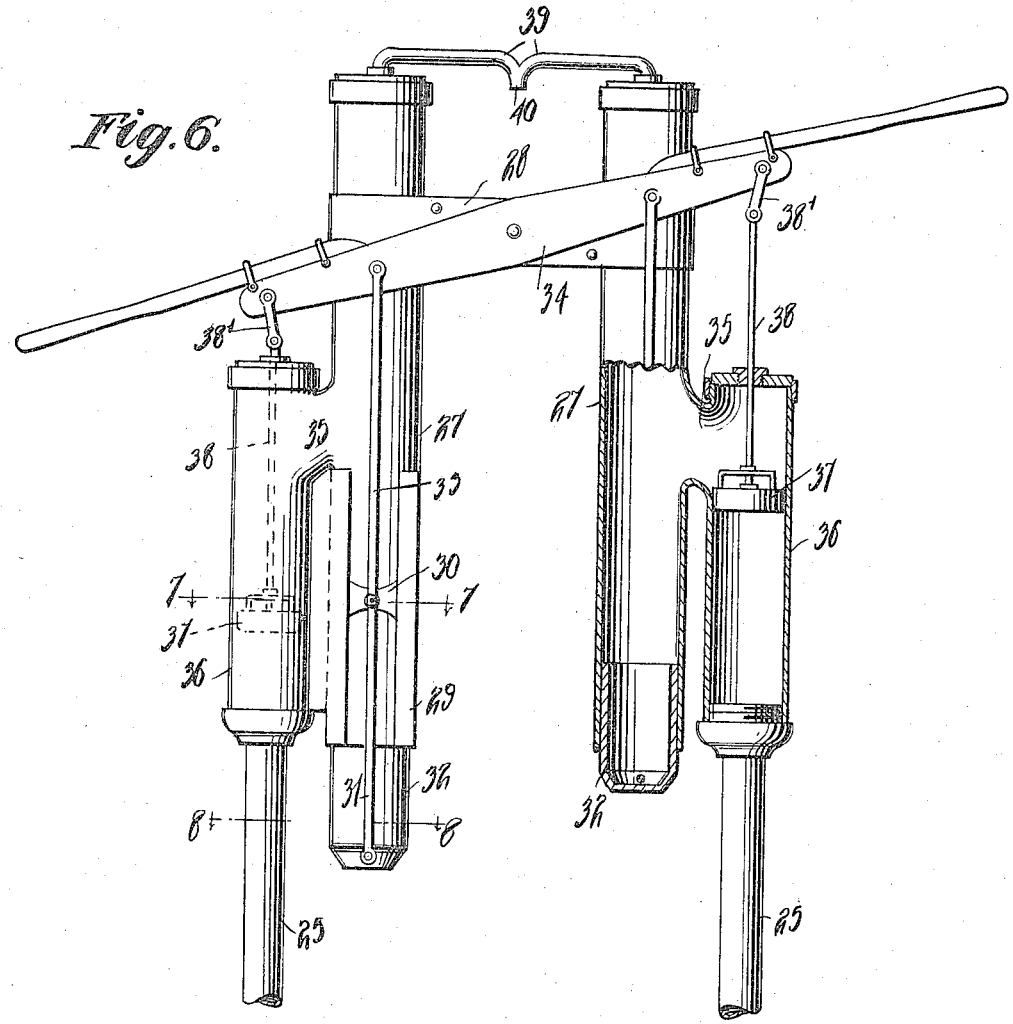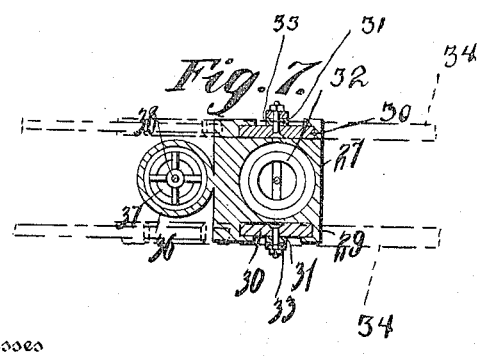

JOHN TRAIN, OF WESSINGTON SPRINGS, SOUTH DAKOTA.

PUMP.

1,145,528.　　　　　Specification of Letters Patent.　　　Patented July 6, 1915.

Application filed December 17, 1913.　Serial No. 807,310.

*To all whom it may concern:*

Be it known that I, JOHN TRAIN, a citizen of the United States, residing at Wessington Springs, in the county of Jerauld, State of South Dakota, have invented certain new and useful Improvements in Pumps; and I do hereby declare the following to be a full, clear, and exact description of the invention, such as will enable others skilled in the art to which it appertains to make and use the same.

The present invention is directed to improvements in pumps, and has for its object to construct a pump in such a manner that the pumping operation will insure a constant discharge of water.

A further object of the invention is to provide a pump particularly designed for supplying water to irrigation systems, and one which is exceedingly simple in construction, and efficient in operation.

With these and other objects in view, this invention resides in the novel features of construction, formation, combination and arrangement of parts to be hereinafter more fully described, claimed and illustrated in the accompanying drawing, in which:—

Figure 1 is a side elevation of the device. Fig. 2 is a vertical central sectional view. Fig. 3 is a sectional view on line 3—3 of Fig. 2. Fig. 4 is a similar view on line 4—4 of Fig. 2. Fig. 5 is a similar view on line 5—5 of Fig. 3. Fig. 6 is a front elevation of a modified form of the pump, partly in section. Fig. 7 is a sectional view on line 7—7 of Fig. 6. Fig. 8 is a similar view on line 8—8 of Fig. 6.

Referring to the drawing, the numeral 1 designates the pump head, which has formed therein threaded openings 2 which are engaged by the threaded upper ends of the pipes 3, said pipes being held in spaced relation by the plates 4, said plates being held in place by the clamping bolts 5 which pass through the space between said pipes. The lower ends of the pipes 3 have formed integral therewith casings 6, access being had to the casings through the openings 7, said openings having removable closures 8. The lower ends of the casings 6 terminate in paired cylinders 9 and 10. Mounted for reciprocation within the head 1, pipes 3, casings 6 and cylinders 9 are piston rods 11, said rods passing through the upper end of the head 1 and are connected to any suitable operating mechanism. The lower ends of the rods 11 are provided with piston heads 12, said heads being movable the length of the cylinders 9.

Mounted for reciprocation in the cylinders 7 are the piston heads 13, said heads being provided with check valves 14, which are unseated upon the downstroke of the heads 13 so that water may pass through the heads. The heads 13 are provided with spiders 15 to which are connected the lower ends of the short piston rods 16, the upper ends of which are connected to the castings 17, said castings having arms 18 and 19 which are detachably connected to the piston rods 11 by the arms 20 and 21, respectively.

It will be noted that the arms 18 and 20 are disposed in inclined alinement so that when the piston rods 11 are reciprocated movement will be imparted to the piston heads 13. The piston rods 16 will be centered owing to the arms 19 and 21.

The piston rods 11 are formed of sections 22 and 23 which are coupled together by sleeves 24. By forming the rods in this manner it is obvious that the pump can be readily assembled, and that the working parts thereof can be readily inspected upon removal of the closures 8. Connected to the lower ends of the cylinders 10 are pipes 25, which may be of lengths suitable for wells of different depth.

Upon downward movement of the piston heads 13 water will pass the check valves 14, and on the upstroke of the piston rods 11 the check valves will close, thus trapping the water and forcing the same upwardly and through the spout 26. The piston heads 12 upon their upstroke, which is simultaneous with the stroke of the piston heads 13 will aid in forcing the water through the spout.

In the modified form of the invention paired cylinders 27 are provided, the same being held in spaced relation by the clamp 28, said cylinders having formed upon their sides guides 29 in which operate heads 30, said heads having pivotally connected thereto rods 31, the lower ends of which are pivotally connected to the hollow piston heads 32 which reciprocate in the cylinders 27, reciprocatory movement being imparted to the piston heads 32 by the links 33, the upper ends of which are pivotally connected to the lever 34, said lever being pivotally connected to the clamp 28 for rocking movement. Having communication with the cylinders 27 through the necks 35 are cylinders 36 in which operate the valve piston heads 37, the rods 38 of which have their upper ends pivotally connected to the lower ends of the links 38', the upper ends of which are similarly connected to the ends of the lever 34. The upper ends of the cylinders 27 are provided with pipes 39 which terminate in a spout 40 for discharging the water during the pumping operation.

The operation and purpose of the modified form of the invention are the same as those of the preferred form, therefore a description is not thought necessary.

What is claimed is:—

1. In a pump, a head, a pipe connected to the lower end of the head, a pair of spaced cylinders formed integrally with the said lower head, a piston rod operable in said pipe and having a piston head on the lower end thereof located in one of the cylinders, outwardly extending arms on said piston rod, an arm detachably mounted on said first mentioned arms, a piston rod adjustably and detachably mounted in said last mentioned arms, a piston head having a gravity actuated valve on the lower end of said rod and a door detachably mounted adjacent the upper end of the last mentioned piston rod.

2. In a pump, a head, a pipe connected thereto, a pair of spaced parallel cylinders formed integrally with the pipe, one of said cylinders having an opening in the upper end thereof, a door removably closing said opening, a piston rod extending into one of said cylinders and having a piston on the lower end thereof, a second piston rod adjustably mounted on the first mentioned rod and extending into the other of said cylinders, and a piston head having a valve therein on the lower end of said last mentioned rod.

In testimony whereof, I affix my signature, in the presence of two witnesses.

JOHN TRAIN.

Witnesses:
CHAS. R. HATCH,
C. H. GALL.

Copies of this patent may be obtained for five cents each, by addressing the "Commissioner of Patents, Washington, D. C."